United States Patent [19]

Westfall et al.

[11] Patent Number: 4,660,115
[45] Date of Patent: Apr. 21, 1987

[54] VIDEO TAPE CASSETTE WITH INTERNAL TAPE ERASING MEANS

[76] Inventors: Wade H. Westfall; Roy Wheaton, both of P.O. Box 1485, Piqua, Ohio 45356

[21] Appl. No.: 713,300

[22] Filed: Mar. 18, 1985

[51] Int. Cl.$^4$ ............................................. G11B 23/02
[52] U.S. Cl. .................................... 360/132; 242/198; 360/66
[58] Field of Search .................... 360/132, 118, 66; 242/198-199

[56] References Cited

U.S. PATENT DOCUMENTS 3,612,774 10/1971 Wiklund ............................... 360/118
4,017,905 4/1977 Convertine et al. ............. 360/118 X

FOREIGN PATENT DOCUMENTS 0009404 1/1977 Japan ..................................... 360/66
2119753 11/1983 United Kingdom ............... 360/132

Primary Examiner—John H. Wolff
Assistant Examiner—David J. Severin
Attorney, Agent, or Firm—Jacox & Meckstroth

[57] ABSTRACT

A video tape cassette includes a case or housing formed by upper and lower mating case sections of molded plastics material. A tape supply reel and a take-up reel are supported for rotation within the housing, and a prerecorded magnetic tape is wound onto the supply reel. The leading end portion of the tape extends around guide rollers along a predetermined path to the take-up reel, and a tape erasing element or magnet is supported within the housing to erase the prerecorded material from the tape as it is wound onto the take-up reel and thereby provide for only one time use of the prerecorded material.

13 Claims, 6 Drawing Figures

U.S. Patent    Apr. 21, 1987    4,660,115
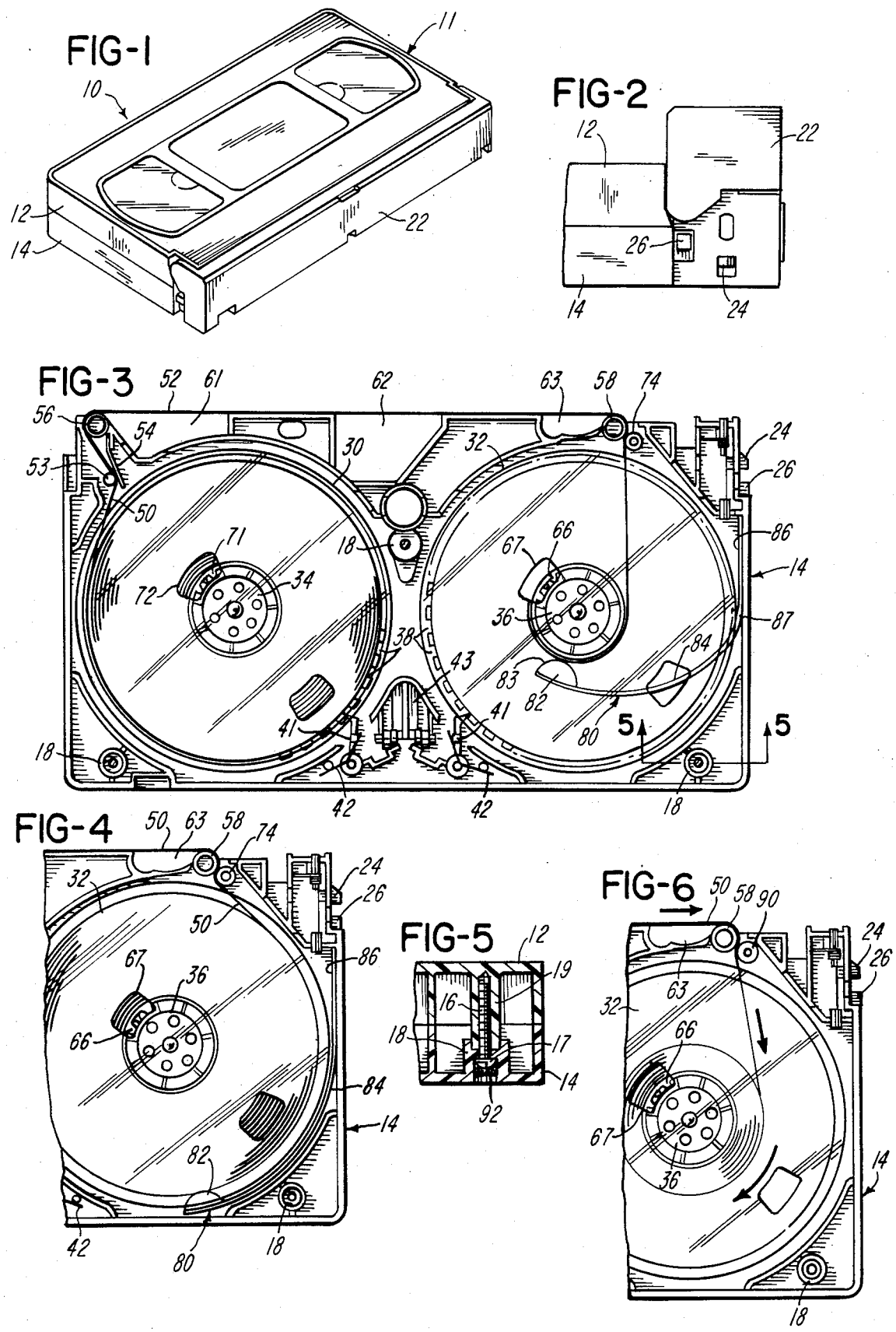

VIDEO TAPE CASSETTE WITH INTERNAL TAPE ERASING MEANS

BACKGROUND OF THE INVENTION

In the art of video cassette recorders using either the VHS or BETA format, it is common for owners of the recorders and players to rent video tape cassettes having prerecorded video programs or materials such as a variety of movies. Usually, the cassette rental stores purchase the prerecorded tape cassettes either directly or indirectly from the owners of the programs or materials such as from motion picture studio companies. It is not uncommon for a rental store to rent a video tape cassette with prerecorded material to dozens of customers each of whom may pay from $1.00 to $4.00 per day for renting the prerecorded video tape cassette. While cassette rental customers have the option to purchase a prerecorded tape cassette at a price, for example, between $30.00 and $70.00, it has been found that most customers desire to rent a prerecorded tape cassette for a short period of time. After the rental period, the prerecorded tape cassette is returned to the rental store.

A dispute has arisen between the copyright owners of prerecorded programs or materials and the owners of the video tape cassette rental stores. The owners of the copyrights believe they should receive a copyright royalty from the owner of a rental store whenever a prerecorded video tape cassette is rented to a customer. However, the existing United States Copyright Act of 1976 does not provide for any such payment. Thus substantial time, money and effort has been expended towards convincing the United States Congress that the Copyright Act requires an amendment to provide for payment of a copyright royalty whenever a tape cassette is rented with prerecorded copyright material. In this manner, the amount of use of prerecorded material would be reflected in the amount of payment of copyright royalties.

SUMMARY OF THE INVENTION

The present invention is directed to an improved video tape cassette which is ideally suited for marketing prerecorded copyright programs or materials such as motion pictures, and which substantially reduces or eliminates the problem or dispute described above. The video tape cassette of the invention incorporates internal tape erasing means which provide for one time use or viewing of the material prerecorded on the video tape after which the material is automatically erased. Thus, the video tape cassette of the invention provides for marketing and selling prerecorded and sealed tape cassettes of copyright materials directly to consumers or owners of video cassette recorders, thus eliminating the need to rent the cassettes. For example, the video tape cassette of the invention enables a copyright owner of a motion picture to sell a copy of the motion picture to a consumer at a price substantially the same or only slightly greater than the consumer pays for renting a cassette prerecorded with the motion picture. The substantial increase in the volume of sales by the copyright owners of the prerecorded materials enables the copyright owners to reduce the selling prices of the copyright materials to only a few dollars, especially if the self-erased tape cassettes are returned to the distributing store for a deposit return in a manner similar to the deposit return for returnable bottles which contain soft drinks.

In general, a video tape cassette is constructed in accordance with the invention by supporting within a sealed cassette case or housing a tape erasing head or magnetic element which contacts the outer surface of the magnetic tape and erases the prerecorded material as the tape is wound onto the take-up reel within the housing. In one embodiment, the erasing head or magnet is supported for movement, within the take-up reel by a flexible plastic strip which forms an arm having one end portion secured by adhesive to the inner surface of the case or housing. In another embodiment, one of the tape guide rollers within the cassette housing and contacting the coated surface of the tape is formed as a permanent magnet and is located adjacent the take-up reel.

Other features and advantages of the invention will be apparent from the following description, the accompanying drawing and the appended claims.

BRIEF DESCRIPTION OF THE DRAWING

FIG. 1 is a perspective view of a video tape cassette constructed in accordance with the invention;

FIG. 2 is a fragmentary elevational view of the cassette shown in FIG. 1 and illustrating the tape protector cover in its upper retracted position while the tape cassette is being used in a tape recorder;

FIG. 3 is a plan view of the tape cassette shown in FIG. 1 with the upper case section removed to show an internal tape erasing means according to one embodiment and prior to using the tape cassette;

FIG. 4 is a fragmentary plan view of a portion of the cassette shown in FIG. 3 and illustrating the position of the tape erasing means after the tape cassette is completely used and erased;

FIG. 5 is a fragmentary section taken generally on the line 5—5 of FIG. 3; and

FIG. 6 is a fragmentary plan view similar to FIG. 4 and illustrating another form of internal erasing means constructed in accordance with the invention.

DESCRIPTION OF THE PREFERRED EMBODIMENTS

FIG. 1 illustrates a VHS video tape cassette 10 constructed in accordance with the invention and including a case or housing 11 formed by an upper case section 12 and a lower case section 14 each of which is injection molded of a rigid plastics material. The mating case sections 12 and 14 are arranged in opposing relation and are rigidly secured together by a series of threaded fasteners 16 (FIG. 5) each having a head 17 recessed within a cylindrical cavity defined by a tubular portion 18 molded as an integral part of the bottom case section 14. Each fastener or screw 16 is self-threaded into a tubular portion 19 molded as an integral part of the upper case section 12. The head 17 of each screw 16 has a single direction slot with diametrically opposed cam surfaces so that each screw 16 may be tightened with a conventional screwdriver but not released or removed with the screwdriver.

The cassette 10 also includes a tape cover section 22 which is molded of a rigid plastics material and is supported by the upper case section 12 for pivotal movement between a lower tape covering position (FIG. 1) and an upper retracted (FIG. 2) position. In a conventional manner, the cover section 22 is retained in its lower position by a latch element 24 (FIG. 2) which is released when the video cassette 10 is inserted into a video cassette recorder (VCR) and a member in the recorder depresses a latch release buttom 26. The cover section 22 is then pivoted to its upper retracted position as shown in FIG. 2.

As shown in FIG. 3, the cassette housing 11, formed by the case sections 12, 14 and 22, encloses a transparent spool-like circular tape supply reel 30 and an identical circular take-up reel 32. The reels have corresponding hollow hubs 34 and 36 and are supported for limited lateral movement as well as for rotation on parallel axes. The bottom wall or flange of each reel has peripherally spaced notches 38, and the notches receive corresponding V-shaped and pivotally supported ratchet pawls 41. The pawls 41 are pivoted against torsion springs 42 to retracted positions when the cassette 10 is inserted into a tape recorder by a member which engages a pivotally supported release actuator 43. The ratchet pawls 41 prevent undesirable rotation of the reels 30 and 32 until the cassette 10 is inserted into a tape recorder.

A prerecorded magnetic tape 50 is wound on the supply reel 30, and a leading end portion 52 of the tape 50 is directed between a post 53 and a tape tension leaf spring 54 and then around a metal guide roller 56 to a metal guide roller 58. The rollers 56 and 58 are rotatably supported by pins molded as integral parts of the case sections 14. The leading end portion 52 of the tape 50 extends along a straight path which is established by the rollers 56 and 58 and crosses over cavities or recesses 61, 62 and 63 formed within the case sections 12 and 14. When the cassette 10 is inserted into a video cassette recorder, the recesses or cavities 61, 62 and 63 receive rollers or elements (not shown) which pull the leading end poriton 52 of the tape 50 into the recorder and around the cylindrical recording and playing head (not shown).

As also shown in FIG. 3, the leading end poriton 52 of the tape 50 extends from the guide roller 58 to the hub 36 of the take-up reel 32. The end portion is secured to the hub 36 by wrapping the end portion around a removable hub segment 66 inserted into the hub 36 through a window or opening 67 within the take-up reel 32. In a similar manner, the trailing end portion of the tape 50 is attached or connected to the hub 34 of the supply reel 30 by a hub segment 71 inserted into the hub 34 through a window or opening 72. A plastic guide roller 74 (FIG. 3) is supported for rotation by a pin molded as an integral part of the lower case section 14 and is located adjacent the guide roller 58. The guide roller 74 contacts the outer surface of the tape 50, and this is the surface which has the magnetizable coating with the magnetically prerecorded material.

In accordance with the present invention, magnetic tape erasing means 80 are located within the housing 11 between the case sections 12 and 14 for progressively erasing the prerecorded material on the tape 50 as the tape is wound onto the take-up reel 32. In the embodiment shown in FIGS. 3 and 4, the tape erasing means 80 includes a part cylindrical permanent magnet 82 having a smooth outer surface 83 forming line contact with the outer coated surface of the tape 50. The magnet 82 is adhesively attached to one end portion of a curved arm 84 formed by a strip of thin flexible plastics sheet material. The strip or arm 84 has an opposite end portion 86 which is attached by adhesive to the adjacent end wall of the lower case section 14. The arm 84 extends into the reel 32 and flexes at 87.

The arm 84 has a radius of curvature generally the same as the radius of the outer cylindrical surface of the take-up reel 32. The arm 84 exerts a predetermined force by the magnet 82 against the outer surface of the tape 50 as the tape is wound onto the take-up reel 32. When the tape 50 is completely unwound from the supply reel 30 and fully wound onto the take-up reel 32, the flexible arm 84 and the magnet 82 are positioned as shown in FIG. 4 where the magnet 82 continues to contact the outer coated surface of the tape 50. The strength of the magnet 82 is selected so that it effectively erases the prerecorded material on the tape 50 as the tape winds onto the pick-up reel 32 but is sufficiently low so that the magnet 82 does not effect the prerecorded material on the supply reel 30.

Referring to FIG. 6 which illustrates another embodiment of internal magnetic tape erasing means in accordance with the invention, a tape guide roller 90 is constructed of a permanently magnetized material and replaces the molded plastic guide roller 74 referred to above in connection with FIG. 3. The magnetic roller 90 contacts the outer coated surface of the prerecorded tape 50 and is effective to erase the prerecorded material from the tape as the tape winds onto the take-up reel 32. Thus the magnetic erasing roller 90 or a non-rotating magnet mounted on the support pin for the roller functions as an internal erasing means in the same manner as the flexible arm and magnet 82 which are supported for movement within the take-up reel 32.

As mentioned above, the single direction fasteners or screws 16 secure the case sections 12 and 14 together, and the one way heads 17 of the screws prevent simple removal of the screws 16 for access to the internal tape erasing means. As a further prevention to simple removal of the screws 16, each of the heads 17 is potted within the corresponding tubular portion 18 of the housing section 14 by an epoxy material 92. Thus a special tool is required to remove the epoxy material 92 and to rotate the screw 16 counter-clockwise in order to remove the screws and open the case or housing 10. This form of sealing the housing 11 prevents a user from easily removing the tape erasing means so that the prerecorded material is not erased and can be replayed.

From the drawing of the above description, it is apparent that a video tape cassette constructed in accordance with the invention, provides desirable features and advantages. As mentioned above, the cassette 10 permits the owner of copyright material such as a movie, to prerecord the material on the tape 50 wound onto the supply reel 30 within the cassette 10 and then sell the cassette directly to a consumer having a video cassette recorder. The copyright material is played once by the consumer and is then automatically erased by the tape erasing means within the cassette. Thus the owner of the copyright material does not have to be concerned that the copyright material will be reused by a third party. As a result, the copyright owner obtains a substantial increase in the volume of sales of the copyright material, which permits a substantial reduction in the selling price of each prerecorded cassette. As also mentioned above, the video cassettes with prerecorded material may be sold with a deposit for the cassette. The deposit is returned to the purchaser when the erased cassette is returned to the retail store from which the cassette is purchased. While the invention is described above in connection with a VHS cassette, it is to be understood that the internal tape erasing means of the invention may also be used in connection with any video tape cassette including a BETA cassette.

While the forms of internal tape erasing means herein described constitute preferred embodiments of the invention, it is to be understood that the invention is not limited to the precise forms of internal erasing means described, and that changes may be made therein without departing from the scope and spirit of the invention as defined in the appended claims.

The invention having thus been described, the following is claimed:

1. A video tape cassette for inserting into a video cassette recorder and for removing from the recorder, said cassette comprising a generally rectangular box-like housing formed by an upper case section and a mating lower case section disposed in opposing relation, means for securing said case sections together with said case sections defining a generally enclosed chamber, a supply reel and a take-up reel each having a hub portion and supported within said chamber between said case sections for rotation on parallel spaced axes, a flexible magnetic tape having prerecorded information thereon, said tape being wound on said hub portion of said supply reel and having a leading end portion connected to said hub portion of said take-up reel, means supported by said case sections for guiding said tape from said supply reel to said take-up reel and along a predetermined path, a magnetic element disposed within said chamber, means within said chamber for supporting said magnetic element adjacent said tape on said take-up reel, said supporting means being adapted to move in response to the build-up of said tape on said take-up reel, and said magnetic element on said supporting means progressively erasing the prerecorded information on said tape as said tape is wound on said take-up reel and after said tape is diverted from said path into the video cassette recorder thereby permitting one time viewing of the prerecorded information on said tape prior to erasing the prerecorded information.

2. A video tape cassette as defined in claim 1 wherein said means for securing said upper and lower case sections together comprise a set of threaded fasteners each having a head with single direction tool rotating surface.

3. A video tape cassette as defined in claim 1 wherein said means for supporting said magnetic element comprise a movable spring-like arm having one end portion supporting said magnetic element within said take-up reel, said arm having an opposite end portion, and means connecting said opposite end portion of said arm to said housing and supporting said magnet and said arm for movement within said take-up reel.

4. A video tape cassette as defined in claim 3 wherein said arm comprises a flexible strip of thin plastics material.

5. A video tape cassette as defined in claim 4 and including adhesive means securing said opposite end portion of said strip to said lower case section.

6. A video tape cassette as defined in claim 3 wherein said take-up reel has a circular outer surface with a predetermined radius, and said arm has a general curvature of approximately the same radius.

7. A video tape cassette for inserting into a video cassette recorder and for removing from the recorder, said cassette comprising a generally rectangular box-like housing formed by an upper case section and a mating lower case section disposed in opposing relation, means for securing said case sections together with said case sections defining a generally enclosed chamber, a supply reel and a take-up reel each having a hub portion and supported within said chamber between said case sections for rotation on parallel spaced axes, a flexible magnetic tape having prerecorded information thereon, said tape being wound on said hub portion of said supply reel and having a leading end portion connected to said hub portion of said take-up reel, means supported by said case sections for guiding said tape from said supply reel to said take-up reel and along a predetermined path, a magnetic element disposed within said chamber, a movable arm within said chamber, said arm having a first portion supporting said magnetic element adjacent said tape on said take-up reel, said arm having a second portion spaced from said first portion, means connecting said second portion of said arm to said housing, said connecting means supporting said arm and magnetic element for movement in response to the build-up of said tape on said take-up reel, and said magnetic element on said arm, progressively erasing prerecorded information on said tape as said tape is wound on said take-up reel and after said tape is diverted from said path into the video cassette recorder thereby permitting one time viewing of the prerecorded information on said tape prior to erasing the prerecorded information.

8. A video tape cassette as defined in claim 7 wherein said housing includes an elongated cover section pivotably connected to one of said case sections, and said arm and said cover section are generally diametrically disposed relative to said hub of said take-up reel.

9. A video tape cassette as defined in claim 7 wherein said means for securing said upper and lower case sections together comprise a set of fasteners each having a head, and means for preventing convenient removal of said fasteners from said housing.

10. A video tape cassette as defined in claim 7 wherein said arm comprises a flexible strip of thin spring-like plastics material.

11. A video tape cassette as defined in claim 11 and including adhesive means securing said second portion of said strip to said lower case section.

12. A video tape cassette for inserting into a video cassette recorder and for removing from the recorder, said cassette comprising a generally rectangular box-like housing formed by an upper case section and a lower case section disposed in opposing relation, means for securing said mating case sections together with said case sections defining a generally enclosed chamber, a supply reel and a take-up reel each having a hub portion and supported within said chamber between said case sections for rotation on parallel spaced axes, a flexible magnetic tape having prerecorded information thereon, said tape being wound on said hub portion of said supply reel and having a leading end portion connected to said hub portion of said take-up reel, means supported by said case sections for guiding said tape from said supply reel to said take-up reel and along a predetermined path, a magnetic element disposed within said chamber adjacent said take-up reel, means supporting said magnetic element, and said magnetic element progressively erasing prerecorded material on said tape as said tape is wound on said take-up reel and after said tape is diverted from said path into said video cassette recorder thereby permitting one time viewing of the prerecorded material on said tape prior to erasing the prerecorded information.

13. A video tape cassette as defined in claim 12 wherein said housing includes an elongated cover section pivotably connected to one of said case sections, and said magnetic element and said cover section are generally diametrically disposed relative to said hub of said take-up reel.

* * * * *